United States Patent
Wei

(10) Patent No.: US 9,900,476 B2
(45) Date of Patent: Feb. 20, 2018

(54) DISPLAY CIRCUIT AND CONTROL METHOD THEREFOR

(71) Applicant: LEYARD OPTOELECTRONIC CO., LTD., Beijing (CN)

(72) Inventor: Hongliang Wei, Beijing (CN)

(73) Assignee: LEYARD OPTOELECTRONIC CO., LTD., Beijing (CN)

( * ) Notice: Subject to any disclaimer, the term of this patent is extended or adjusted under 35 U.S.C. 154(b) by 0 days.

(21) Appl. No.: 15/379,127

(22) Filed: Dec. 14, 2016

(65) Prior Publication Data

US 2017/0272620 A1 Sep. 21, 2017

(30) Foreign Application Priority Data

Mar. 17, 2016 (CN) .......................... 2016 1 0154514

(51) Int. Cl.
*H04N 3/12* (2006.01)
*H04N 5/70* (2006.01)
*G09G 3/34* (2006.01)

(52) U.S. Cl.
CPC ................ *H04N 3/12* (2013.01); *H04N 5/70* (2013.01); *G09G 3/3406* (2013.01); *G09G 2320/0646* (2013.01)

(58) Field of Classification Search
CPC .. H04N 3/72; H04N 5/70; G09G 3/22; G09G 3/3216; G09G 3/3266; G09G 2300/06;
(Continued)

(56) References Cited

U.S. PATENT DOCUMENTS

2003/0227278 A1* 12/2003 Sakuragi .............. G09G 3/3216
320/135
2012/0176062 A1* 7/2012 Sato ................... H05B 33/0827
315/294
(Continued)

FOREIGN PATENT DOCUMENTS

EP        1 876 582 A2    1/2008
KR    10-2008-0006118     1/2008

OTHER PUBLICATIONS

Search Report of European Patent Application No. 16203108.2 dated Jul. 10, 2017.
(Continued)

*Primary Examiner* — Michael Lee
(74) *Attorney, Agent, or Firm* — Pearl Cohen Zedek Latzer Baratz LLP

(57) ABSTRACT

A display circuit and a control method therefor are shown. The display circuit includes: a lamp bead array, a column-oriented drive switch array, a row-oriented drive switch array and a common-anode discharge control circuit, wherein one end of the common-anode discharge control circuit is connected to second ends of lamp beads, in a row direction, in the lamp bead array, and the other end of the common-anode discharge control circuit is grounded; the common-anode discharge control circuit includes a constant current source, a diode and a resistor; a first end of the diode is connected to the second ends of the lamp beads, in the row direction, in the lamp bead array, a second end of the diode is connected to a first end of the constant current source, and the second end of the diode is connected to a first end of the resistor; and a second end of the resistor and a second end of the constant current source are connected to a power supply, and a grounded end of the constant current source is grounded.

13 Claims, 3 Drawing Sheets

(58) Field of Classification Search
CPC ....... G09G 2330/04; G09G 2310/0275; G09G 2330/025; G09G 2310/0248; G09G 3/3406; G09G 2320/0646; H05B 33/083; H05B 33/0827
USPC .......................................................... 348/798
See application file for complete search history.

(56) References Cited

U.S. PATENT DOCUMENTS

| | | | | |
|---|---|---|---|---|
| 2012/0206430 A1* | 8/2012 | Li | ............................ | G09G 3/32 345/211 |
| 2014/0132165 A1* | 5/2014 | Lin | .................... | H05B 33/0824 315/192 |
| 2015/0156829 A1* | 6/2015 | Lin | ...................... | H05B 33/083 315/192 |

OTHER PUBLICATIONS

Office Action of Canadian Patent Application No. 2,951,920 dated Oct. 2, 2017.

\* cited by examiner

DISPLAY CIRCUIT AND CONTROL METHOD THEREFOR

TECHNICAL FIELD OF THE INVENTION

The invention relates to the field of circuits, and in particular to a display circuit and a control method therefor.

BACKGROUND OF THE INVENTION

Currently, small-interval Light-Emitting Diode (LED) televisions are widely applied to various fields of public information display such as an information announcement of a hotel lobby, an airport, a cinema and a hospital, and indoor places such as corporate image publicity, exhibition of cultural relics of a museum, a meeting room, a club, a shopping mall and a hall. New-generation small-interval LED televisions have started to develop to home application.

A display circuit of a current LED television is composed of an LED lamp bead array, a column-oriented drive switch array, a row-oriented drive switch array and a discharge circuit. The LED lamp bead array is in charge of image display. The column-oriented drive switch array mainly comprises a constant current Integrated Circuit (IC), and is in charge of cathode pin control over common-anode LED lamp beads. The row-oriented drive switch array mainly comprises a Metal Oxide Semiconductor (MOS) array, and is in charge of control over an anode of a common-anode LED lamp bead array. The discharge circuit is mainly formed by connecting a resistor to a voltage-regulator diode in series, and is in charge of discharging excess electricity.

The LED lamp bead array is frequently opened and closed, excess electricity exists on a line within a closed time period, and the excess electricity will enable the LED lamp beads to be lighted in an LED turn-off process, so it is necessary to use the discharge circuit to discharge the electricity. FIG. 1 is a diagram of a discharge circuit in the traditional art.

The inventor finds that the existing discharge circuit has, at least, the problems as follows.

Under normal circumstances, an LED forms a path only for the ground via a constant current source. According to an existing discharge mode, after the LED is short-circuited, lamp beads in other columns will form a discharge path for the ground via the short-circuited LED by means of a voltage-regulator diode and a resistor in a turn-on process, current passing through the turned-on LED lamp beads is higher than current under normal circumstances, and the brightness of the lamp beads in this column is increased, thereby causing abnormal display of an LED television, namely a general short-circuit caterpillar phenomenon.

An effective solution is not proposed yet currently for the above problems.

SUMMARY OF THE INVENTION

The embodiments of the invention provide a display circuit and a control method therefor, which are intended to at least solve the technical problem in the traditional art that abnormal display of an LED display screen is caused in an unreasonable discharge mode.

According to one aspect of the embodiments of the invention, a display circuit is provided, which may include: a lamp bead array; a column-oriented drive switch array, wherein one end of the column-oriented drive switch array is connected to a column direction of the lamp bead array, the other end of the column-oriented drive switch array is grounded, and the column-oriented drive switch array is configured to control opening and closing of lamp beads, in a column direction, in the lamp bead array; a row-oriented drive switch array, wherein the row-oriented drive switch array is connected to first ends of lamp beads, in a row direction, in the lamp bead array, and the row-oriented drive switch array is configured to control opening and closing of the lamp beads, in the row direction, in the lamp bead array; and a common-anode discharge control circuit, wherein one end of the common-anode discharge control circuit is connected to second ends of the lamp beads, in the row direction, in the lamp bead array, the other end of the common-anode discharge control circuit is grounded, the common-anode discharge control circuit includes a constant current source, a diode and a resistor, a first end of the diode is connected to the second ends of the lamp beads, in the row direction, in the lamp bead array, a second end of the diode is connected to a first end of the constant current source, the second end of the diode is connected to a first end of the resistor, a second end of the resistor and a second end of the constant current source are connected to a power supply, and a grounded end of the constant current source is grounded.

Furthermore, the diode may be a Schottky diode.

Furthermore, the first end of the constant current source may include multiple output ends, each of the multiple output ends being connected to the corresponding diode in series.

Furthermore, the first end of the constant current source may include 16 output ends.

Furthermore, each row of lamp beads in the lamp bead array may be connected to the corresponding diode.

Furthermore, the lamp bead array may be an LED lamp bead array.

Furthermore, the column-oriented drive switch array may include a constant current IC.

Furthermore, the row-oriented drive switch array may include an MOS array.

According to another aspect of the embodiments of the invention, a control method for a display circuit is also provided, which may include that: when a first row of lamp beads in a lamp bead array is closed and when a second row of lamp beads in the lamp bead array is in a lighted state, a common-anode discharge control circuit is controlled to be turned on in order that a circuit where the first row of lamp beads is located discharges electricity, wherein the first row of lamp beads and the second row of lamp beads are any rows of lamp beads in the lamp bead array, and the first row of lamp beads and the second row of lamp beads are displayed in sequence; it is judged whether the second row of lamp beads is changed from the lighted state to a closed state; and if it is determined that the second row of lamp beads is changed from the lighted state to the closed state, the common-anode discharge control circuit is controlled to be turned off.

Furthermore, the step that it is judged whether the second row of lamp beads is changed from the lighted state to the closed state may include that: a control time sequence configured to control the common-anode discharge control circuit to be turned on and off is acquired; a first control time sequence signal, configured to indicate that the common-anode discharge control circuit is turned on, in the control time sequence is detected, and a second control time sequence signal, configured to indicate that the common-anode discharge control circuit is turned off, in the control time sequence is detected; and it is determined that the second row of lamp beads is changed from the lighted state to the closed state based on that the control time sequence is changed from the first control time sequence signal to the second control time sequence signal.

In the embodiments of the invention, a display circuit includes: a lamp bead array; a column-oriented drive switch array, wherein one end of the column-oriented drive switch array is connected to a column direction of the lamp bead array, the other end of the column-oriented drive switch array is grounded, and the column-oriented drive switch array is configured to control opening and closing of lamp beads, in a column direction, in the lamp bead array; a row-oriented drive switch array, wherein the row-oriented drive switch array is connected to first ends of lamp beads, in a row direction, in the lamp bead array, and the row-oriented drive switch array is configured to control opening and closing of the lamp beads, in the row direction, in the lamp bead array; and a common-anode discharge control circuit, wherein one end of the common-anode discharge control circuit is connected to second ends of the lamp beads, in the row direction, in the lamp bead array, the other end of the common-anode discharge control circuit is grounded, the common-anode discharge control circuit includes a constant current source, a diode and a resistor, a first end of the diode is connected to the second ends of the lamp beads, in the row direction, in the lamp bead array, a second end of the diode is connected to a first end of the constant current source, the second end of the diode is connected to a first end of the resistor, a second end of the resistor and a second end of the constant current source are connected to a power supply, and a grounded end of the constant current source is grounded.

When the row-oriented drive switch array opens a certain row in the lamp bead array for display, the row-oriented drive switch array, in a row where previously-opened lamp beads are located, turns off the row where the previously-opened lamp beads are located, and discharges residual electricity of the row where the previously-opened lamp beads are located, and electricity of a surrounding line coupled to the row where the previously-opened lamp beads are located. A discharge open moment, a discharge time length, an end moment and a discharge quantity can be correspondingly adjusted via software, and balancing is achieved after adjustment. Not only the adaptive discharge of a small-interval LED television can be achieved, but also the power consumption of the discharge circuit can be reduced. A ghost phenomenon on an LED display screen is eliminated, such that the display effect of the display screen is better, thereby solving the technical problem in the traditional art that abnormal display of the LED display screen is caused in an unreasonable discharge mode.

BRIEF DESCRIPTION OF THE DRAWINGS

The drawings illustrated herein are used to provide further understanding of the invention, and form a part of the invention. The schematic embodiments and illustrations of the invention are used to explain the invention, and do not form improper limits to the invention. In the drawings.

DETAILED DESCRIPTION OF THE INVENTION

Figure 1:
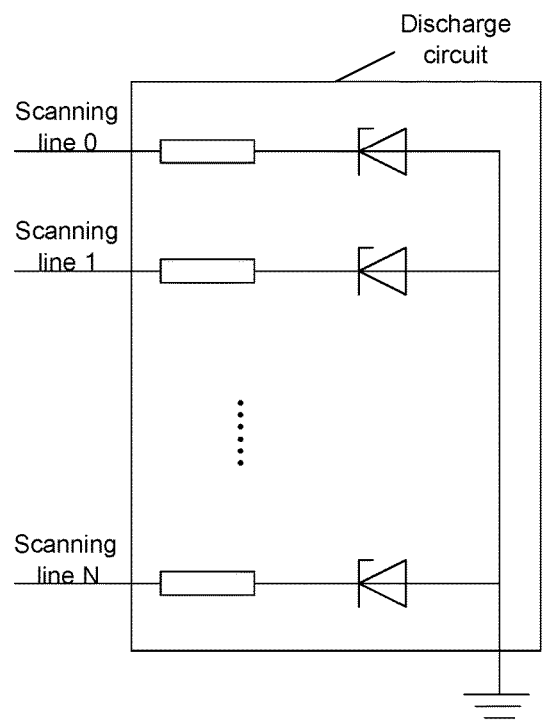
FIG. 1 is a diagram of a discharge circuit in the traditional art.

In order to make those skilled in the art better understand the solutions of the invention, the technical solutions in the embodiments of the invention will be clearly and completely described below with reference to the drawings in the embodiments of the invention. Obviously, the described embodiments are only a part of the embodiments of the invention, not all of the embodiments. On the basis of the embodiments of the invention, all other embodiments obtained on the premise of no creative work of those skilled in the art shall fall within the protective scope of the invention.

It is important to note that the specification and claims of the invention and terms 'first', 'second' and the like in the drawings are used to distinguish similar objects, and do not need to describe a specific sequence or a precedence order. It will be appreciated that data used in such a way may be exchanged under appropriate conditions, in order that the embodiments of the invention described here can be implemented in a sequence other than sequences graphically shown or described here. In addition, terms 'include' and 'have' and any inflexions thereof are intended to cover non-exclusive inclusions. For instance, it is not limited for processes, methods, systems, products or devices containing a series of steps or units to clearly list those steps or units, and other steps or units which are not clearly listed or are inherent to these processes, methods, products or devices may be included instead.

The technical terms involved in the embodiments of the invention are explained as follows firstly.

A small-interval LED television refers to an LED television of which an LED point interval is smaller than P2.5, and a display screen of the small-interval LED television mainly adopts a P2.5 LED display screen, a P2.0 LED display screen, a P1.8 LED display screen or a P1.5 LED display screen.

A Schottky diode is also called a Schottky barrier diode. The Schottky diode is manufactured using a principle of a metal-semiconductor junction formed by contact between metal and a semiconductor instead of a principle of a PN junction formed by contact between a P-type semiconductor and an N-type semiconductor. The Schottky diode has the advantages of high switching frequency, forward voltage reduction and the like.

Figure 2:
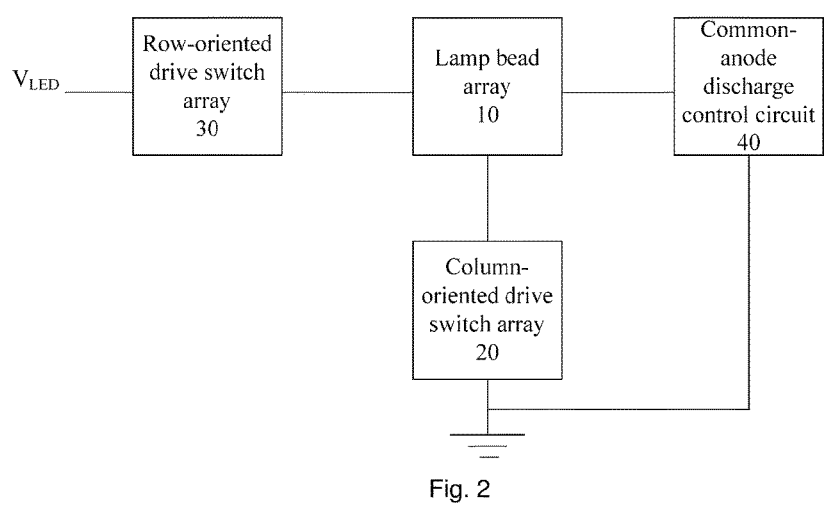
FIG. 2 is a structure block diagram of a display circuit according to an embodiment of the invention.

FIG. 2 is a structure block diagram of a display circuit according to an embodiment of the invention. As shown in FIG. 2, the display circuit includes a lamp bead array 10, a column-oriented drive switch array 20, a row-oriented drive switch array 30 and a common-anode discharge control circuit 40. $V_{LED}$ is a power supply connected to the row-oriented drive switch array 30.

One end of the column-oriented drive switch array is connected to a column direction of the lamp bead array, the other end of the column-oriented drive switch array is grounded, and the column-oriented drive switch array is configured to control opening and closing of lamp beads, in a column direction, in the lamp bead array.

The row-oriented drive switch array is connected to first ends of lamp beads, in a row direction, in the lamp bead array, and the row-oriented drive switch array is configured to control opening and closing of the lamp beads, in the row direction, in the lamp bead array.

One end of the common-anode discharge control circuit is connected to second ends of the lamp beads, in the row direction, in the lamp bead array, and the other end of the common-anode discharge control circuit is grounded, wherein the common-anode discharge control circuit includes a constant current source, a diode and a resistor, a first end of the diode is connected to the second ends of the lamp beads, in the row direction, in the lamp bead array, a second end of the diode is connected to a first end of the constant current source, the second end of the diode is connected to a first end of the resistor, a second end of the resistor and a second end of the constant current source are connected to the power supply, and a grounded end of the constant current source is grounded.

The constant current source and the diode constitute a discharge passage, and the unilateral conductivity of the diode can protect a constant current source IC.

The resistor can quickly switch on the discharge passage of the constant current source IC, can keep the output of the constant current source continuous, and can reduce voltage fluctuation of the output end of the constant current source.

The lamp bead array can be configured to display an image. The lamp bead array can be an LED lamp bead array. The small-interval LED television dynamically displays a picture by alternately switching LED lamp bead turn-on time in a time division manner. When the row-oriented drive switch array opens a certain row in the lamp bead array for display, the row-oriented drive switch array, in a row where previously-opened lamp beads are located, turns off the row where the previously-opened lamp beads are located, and discharges residual electricity of the row where the previously-opened lamp beads are located, and electricity of a surrounding line coupled to the row where the previously-opened lamp beads are located. A discharge open moment, a discharge time length, an end moment and a discharge quantity can be correspondingly adjusted via software, and balancing is achieved after adjustment. Not only the adaptive discharge of the small-interval LED television can be achieved, but also the power consumption of the discharge circuit can be reduced. A ghost phenomenon on an LED display screen is eliminated, such that the display effect of the display screen is better.

For instance, when the row-oriented drive switch array opens a row $r_3$ in the lamp bead array for display, the row-oriented drive switch array, in a row $r_2$ where previously-opened lamp beads are located, turns off the lamp beads in the row $r_2$, and discharges residual electricity of the row $r_2$ and electricity of a surrounding line coupled to the row $r_2$. The row $r_2$ and the row $r_3$ are any rows in the lamp bead array, and the row $r_2$ and the row $r_3$ are displayed in sequence.

A discharge start moment and a discharge end moment can be adjusted via a control time sequence, thereby finding an optimal discharge moment and an optimal discharge time length. In addition, the magnitude of discharge current can be controlled, such that a discharge electric quantity is optimal, and the discharge effect is optimized by integrating the discharge time length, the discharge start moment, the discharge end moment and the discharge electric quantity. Over-discharge and mis-discharge can be avoided by program-based control, such that the display effect of the LED television is better.

Optionally, the lamp bead array can be an LED lamp bead array. Optionally, the column-oriented drive switch array can include a constant current IC. Optionally, the row-oriented drive switch array can include an MOS array. The diode can be a Schottky diode. The Schottky diode has the advantage of forward voltage reduction. Thus, the power consumption in a discharge process can be reduced using the Schottky diode.

Figure 3:
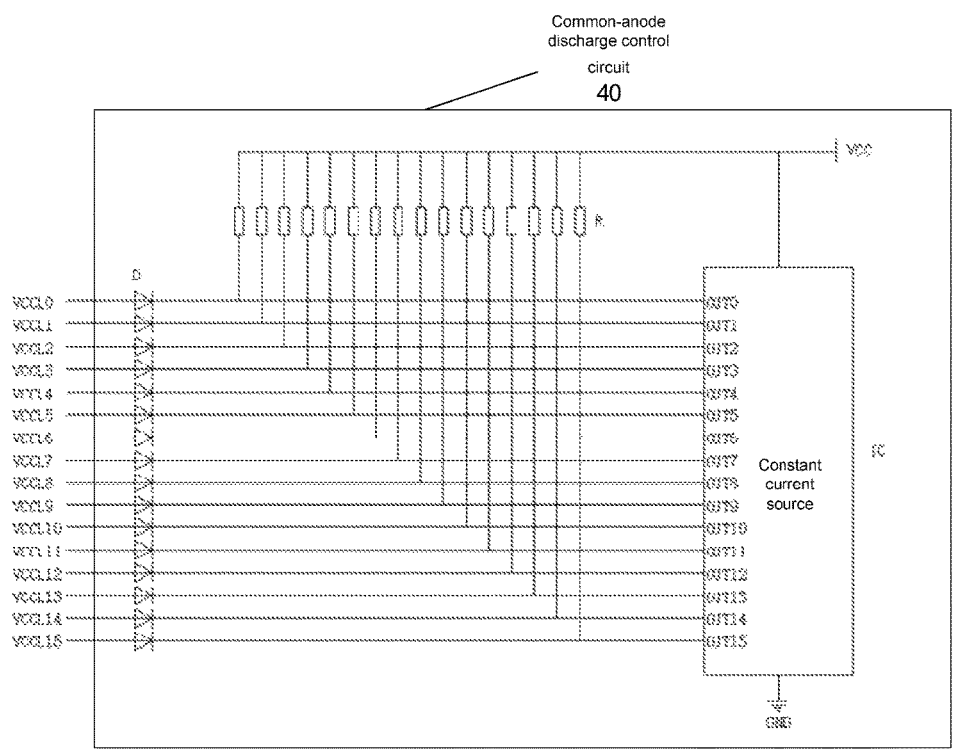
FIG. 3 is a diagram of a common-anode discharge circuit according to an embodiment of the invention.

FIG. 3 is a diagram of a common-anode discharge circuit according to an embodiment of the invention. As shown in FIG. 3, the common-anode discharge control circuit 40 includes a constant current source IC, a diode D and a resistor R, wherein a first end of the diode is connected to second ends of lamp beads, in a row direction, in a lamp bead array, a second end of the diode is connected to a first end of the constant current source, the second end of the diode is connected to a first end of the resistor, a second end of the resistor and a second end of the constant current source are connected to a power supply, and a grounded end of the constant current source is grounded.

Optionally, the constant current source has multiple output ends, each output end is connected to the corresponding diode, and the number of the diodes is equal to that of the output ends of the constant current source. Optionally, the number of the output ends of the constant current source is equal to the row number of the lamp bead array.

Optionally, the first end of the constant current source includes 16 output ends. That is, when the row number of the lamp bead array is 16, the number of the output ends of the constant current source is 16. As shown in FIG. 3, VCCL0 to VCCL15 are 16 rows of the lamp bead array, respectively; and OUT0 to OUT15 are 16 output ends of the constant current source, respectively.

A small-interval LED television dynamically displays an image in a dynamic scanning manner. When a previous row of lamp beads is closed, the common-anode discharge circuit is controlled to discharge electricity to a line of this row, and discharge time continues to a subsequent opened row closing moment, wherein a discharge open moment, a discharge time length, an end moment and a discharge quantity can be correspondingly adjusted via software, and balancing is achieved after adjustment. Not only the adaptive discharge of the small-interval LED television can be achieved, but also the power consumption of the discharge circuit can be reduced. A ghost phenomenon on an LED display screen is eliminated, such that the display effect of the display screen is better.

According to an embodiment of the invention, a control method for a display circuit is provided. It is important to note that the steps shown in a flowchart of the drawings can be executed in a computer system including, for instance, a set of computer executable instructions. Moreover, although a logic sequence is shown in the flowchart, the shown or described steps can be executed in a sequence different from the sequence here under some circumstances.

Figure 4:
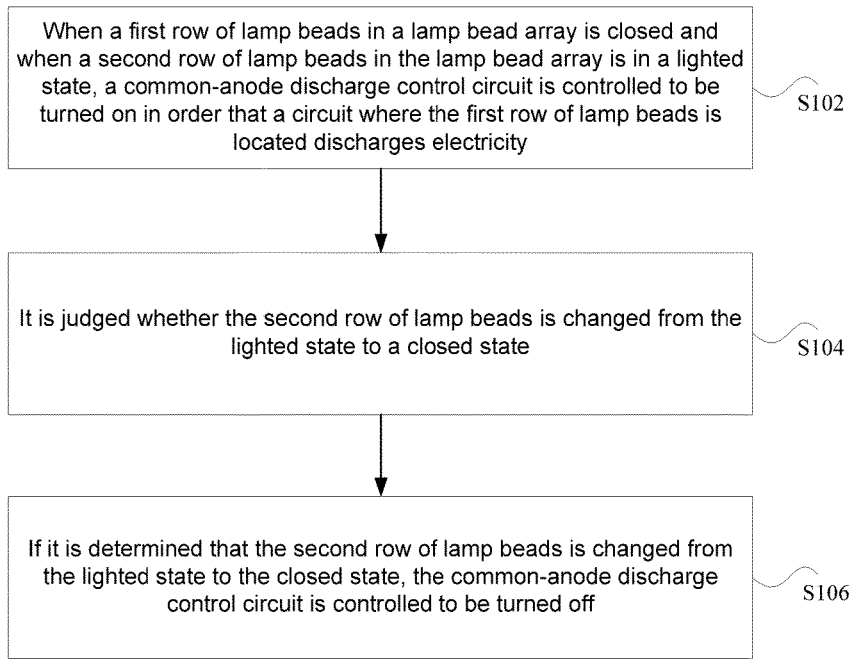
FIG. 4 is a flowchart of a control method for a display circuit according to an embodiment of the invention.

FIG. 4 is a flowchart of a control method for a display circuit according to an embodiment of the invention. As shown in FIG. 4, the method includes the steps as follows.

Step S102: When a first row of lamp beads in a lamp bead array is closed and when a second row of lamp beads in the lamp bead array is in a lighted state, a common-anode discharge control circuit is controlled to be turned on in order that a circuit where the first row of lamp beads is located discharges electricity, wherein the first row of lamp beads and the second row of lamp beads are any rows of lamp beads in the lamp bead array, and the first row of lamp beads and the second row of lamp beads are displayed in sequence.

Step S104: It is judged whether the second row of lamp beads is changed from the lighted state to a closed state.

Step S106: If it is determined that the second row of lamp beads is changed from the lighted state to the closed state, the common-anode discharge control circuit is controlled to be turned off.

When the first row of lamp beads is closed and when the second row of lamp beads is lighted, the common-anode discharge control circuit is turned on, and residual electricity in the first row of lamp beads is discharged. When the second row of lamp beads is changed from the lighted state to the closed state, the common-anode discharge control circuit is controlled to be turned off, and discharge of electricity to the first row of lamp beads is completed, thereby achieving reasonable control over the discharge circuit, solving the technical problem in the traditional art that abnormal display of an LED display screen is caused in an unreasonable discharge mode, and achieving the technical effect of making the display effect of the display screen better.

Optionally, the step that it is judged whether the second row of lamp beads is changed from the lighted state to the closed state includes that: a control time sequence configured to control the common-anode discharge control circuit to be turned on and off is acquired; a first control time sequence signal, configured to indicate that the common-anode discharge control circuit is turned on, in the control time sequence is detected, and a second control time sequence signal, configured to indicate that the common-anode discharge control circuit is turned off, in the control time sequence is detected; and it is determined that the second row of lamp beads is changed from the lighted state to the closed state based on that the control time sequence is changed from the first control time sequence signal to the second control time sequence signal.

The first control time sequence signal is a signal configured to indicate that the common-anode discharge control circuit is turned on, and the second control time sequence signal is a signal configured to indicate that the common-anode discharge control circuit is turned off. When the control time sequence is changed from the first control time sequence signal to the second control time sequence signal, it can be seen that the second row of lamp beads is changed from the lighted state to the closed state. In this case, discharge of electricity to the first row of lamp beads is completed.

The lamp bead array can be configured to display an image. The lamp bead array can be an LED lamp bead array. A small-interval LED television dynamically displays a picture by alternately switching LED lamp bead turn-on time in a time division manner. When a row-oriented drive switch array opens a certain row in the lamp bead array for display, the row-oriented drive switch array, in a row where previously-opened lamp beads are located, turns off the row where the previously-opened lamp beads are located, and discharges residual electricity of the row where the previously-opened lamp beads are located, and electricity of a surrounding line coupled to the row where the previously-opened lamp beads are located. A discharge open moment, a discharge time length, an end moment and a discharge quantity can be correspondingly adjusted via software, and balancing is achieved after adjustment. Not only the adaptive discharge of the small-interval LED television can be achieved, but also the power consumption of the discharge circuit can be reduced. A ghost phenomenon on an LED display screen is eliminated, such that the display effect of the display screen is better.

In the embodiments of the invention, descriptions for each embodiment are emphasized. Parts which are not elaborated in a certain embodiment may refer to relevant descriptions for other embodiments.

In several embodiments provided by the invention, it will be appreciated that the disclosed technical contents may be implemented in other modes. Wherein, the apparatus embodiment described above is only schematic. For instance, the division of the units may be the division of logical functions, and there may be additional division modes during actual implementation. For instance, multiple units or assemblies may be combined or integrated to another system, or some characteristics may be omitted or may be not executed. In addition, displayed or discussed mutual coupling or direct coupling or communication connection may be performed via some interfaces, and indirect coupling or communication connection between units or modules may be in an electrical form or other forms.

The units illustrated as separate components may be or may not be physically separated. Components displayed as units may be or may not be physical units. That is, the components may be located at a place or may be distributed on multiple units. The aims of the solution of the present embodiment may be achieved by selecting some or all units according to actual requirements.

In addition, all function units in all embodiments of the invention may be integrated in a processing unit, or each unit may exist separately and physically, or two or more units may be integrated in a unit. The integrated unit may be implemented in a hardware form or may be implemented in a software function unit form.

If the integrated unit is implemented in the software function unit form and is sold or used as an independent product, the product may be stored in a computer readable storage medium. Based on this understanding, the technical solutions of the invention may be substantially embodied in a software product form or parts contributing to the traditional art or all or some of the technical solutions may be embodied in the software product form, and a computer software product is stored in a storage medium, including a plurality of instructions enabling a computer device, which may be a personal computer, a server or a network device to execute all or some of the steps of the method according to each embodiment of the invention. The storage medium includes: various media capable of storing program codes, such as a U disk, a Read-Only Memory (ROM), a Random Access Memory (RAM), a mobile hard disk, a magnetic disk or an optical disk.

The above is only the preferred implementations of the invention. It shall be pointed out that those skilled in the art can also make some improvements and modifications without departing from the principle of the invention. These improvements and modifications shall fall within the protective scope of the invention.

The invention claimed is:

1. A display circuit, comprising:
    a lamp bead array;
    a column-oriented drive switch array, wherein one end of the column-oriented drive switch array is connected to a column direction of the lamp bead array, the other end of the column-oriented drive switch array is grounded, and the column-oriented drive switch array is configured to control opening and closing of lamp beads, in a column direction, in the lamp bead array;
    a row-oriented drive switch array, wherein the row-oriented drive switch array is connected to first ends of lamp beads, in a row direction, in the lamp bead array, and the row-oriented drive switch array is configured to control opening and closing of the lamp beads, in the row direction, in the lamp bead array; and a common-anode discharge control circuit, wherein one end of the common-anode discharge control circuit is connected to second ends of the lamp beads, in the row direction, in the lamp bead array, the other end of the common-anode discharge control circuit is grounded, the common-anode discharge control circuit comprises a constant current source, a diode and a resistor, a first end of the diode is connected to the second ends of the lamp beads, in the row direction, in the lamp bead array, a second end of the diode is connected to a first end of the constant current source, the second end of the diode is connected to a first end of the resistor, a second end of the resistor and a second end of the constant current source are connected to a power supply, and a grounded end of the constant current source is grounded;

wherein, when a first row of lamp beads in the lamp bead array is closed and when a second row of lamp beads in the lamp bead array is in a lighted state, the common-anode discharge control circuit is controlled to be turned on in order that a circuit where the first row of lamp beads is located discharges electricity, wherein the first row of lamp beads and the second row of lamp beads are any rows of lamp beads in the lamp bead array, and the first row of lamp beads and the second row of lamp beads are displayed in sequence, and wherein, when the second row of lamp beads is changed from the lighted state to the closed state, the common-anode discharge control circuit is controlled to be turned off.

2. The display circuit according to claim 1, wherein the diode is a Schottky diode.

3. The display circuit according to claim 1, wherein the first end of the constant current source comprises multiple output ends, each of the multiple output ends being connected to the corresponding diode in series.

4. The display circuit according to claim 3, wherein the first end of the constant current source comprises 16 output ends.

5. The display circuit according to any one of claim 1, wherein each row of lamp beads in the lamp bead array is connected to the corresponding diode.

6. The display circuit according to claim 1, wherein the lamp bead array is a Light-Emitting Diode (LED) lamp bead array.

7. The display circuit according to claim 1, wherein the column-oriented drive switch array comprises a constant current Integrated Circuit (IC).

8. The display circuit according to claim 1, wherein the row-oriented drive switch array comprises a Metal Oxide Semiconductor (MOS) array.

9. The display circuit according to any one of claim 2, wherein each row of lamp beads in the lamp bead array is connected to the corresponding diode.

10. The display circuit according to any one of claim 3, wherein each row of lamp beads in the lamp bead array is connected to the corresponding diode.

11. The display circuit according to any one of claim 4, wherein each row of lamp beads in the lamp bead array is connected to the corresponding diode.

12. A control method for a display circuit, the display circuit comprising a lamp bead array and a common-anode discharge control circuit, the control method comprising:

when a first row of lamp beads in the lamp bead array is closed and when a second row of lamp beads in the lamp bead array is in a lighted state, controlling the common-anode discharge control circuit to be turned on in order that a circuit where the first row of lamp beads is located discharges electricity, wherein the first row of lamp beads and the second row of lamp beads are any rows of lamp beads in the lamp bead array, and the first row of lamp beads and the second row of lamp beads are displayed in sequence;

judging whether the second row of lamp beads is changed from the lighted state to a closed state; and if it is determined that the second row of lamp beads is changed from the lighted state to the closed state, controlling the common-anode discharge control circuit to be turned off.

13. The control method according to claim 12, wherein judging whether the second row of lamp beads is changed from the lighted state to the closed state comprises:

acquiring a control time sequence configured to control the common-anode discharge control circuit to be turned on and off;

detecting a first control time sequence signal, configured to indicate that the common-anode discharge control circuit is turned on, in the control time sequence, and detecting a second control time sequence signal, configured to indicate that the common-anode discharge control circuit is turned off, in the control time sequence; and determining that the second row of lamp beads is changed from the lighted state to the closed state based on that the control time sequence is changed from the first control time sequence signal to the second control time sequence signal.

* * * * *